(12) United States Patent
Schmidt et al.

(10) Patent No.: US 7,067,002 B2
(45) Date of Patent: *Jun. 27, 2006

(54) UNITIZED FIBROUS CONCRETE REINFORCEMENT

(75) Inventors: Paul Schmidt, Pretty Prairie, KS (US); Gene Lamb, Kingman, KS (US); David Anderson, Kingman, KS (US)

(73) Assignee: Polymer Group, Inc., North Charleston, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/763,463

(22) Filed: Jan. 23, 2004

(65) Prior Publication Data

US 2004/0244653 A1  Dec. 9, 2004

Related U.S. Application Data

(60) Provisional application No. 60/474,049, filed on May 29, 2003, provisional application No. 60/474,039, filed on May 29, 2003, provisional application No. 60/442,672, filed on Jan. 24, 2003, provisional application No. 60/442,574, filed on Jan. 24, 2003.

(51) Int. Cl.
  *C04B 14/38* (2006.01)
  *B28C 5/00* (2006.01)
  *D02G 3/00* (2006.01)

(52) U.S. Cl. ............ 106/711; 428/364; 428/373; 428/374; 428/36.92; 264/228; 366/2; 57/200; 57/210; 57/224

(58) Field of Classification Search .......... 428/364, 428/373, 374, 36.92, 401; 106/711; 264/228; 366/2; 57/200, 210, 224
See application file for complete search history.

(56) References Cited

U.S. PATENT DOCUMENTS

| | | | | |
|---|---|---|---|---|
| 3,644,866 A | * | 2/1972 | Deardurff | 338/214 |
| 3,846,085 A | | 11/1974 | Dunn, Jr. | |
| 4,228,641 A | | 10/1980 | O'Neil | |
| 4,620,401 A | * | 11/1986 | L'Esperance et al. | 52/309.15 |
| 5,399,195 A | | 3/1995 | Hansen et al. | |
| 5,456,752 A | | 10/1995 | Hogan | |
| 5,628,822 A | | 5/1997 | Hogan | |
| 5,807,458 A | * | 9/1998 | Sanders et al. | 156/276 |
| 6,258,159 B1 | | 7/2001 | Pyle | |
| 6,423,134 B1 | | 7/2002 | Trottier et al. | |
| 6,569,525 B1 | | 5/2003 | Rieder et al. | |
| 6,569,526 B1 | | 5/2003 | Rieder et al. | |
| 6,779,950 B1 | * | 8/2004 | Hutchins | 405/259.1 |
| 2003/0044592 A1 | | 3/2003 | Perez et al. | |

FOREIGN PATENT DOCUMENTS

| WO | 00/49211 | * | 8/2000 |
|---|---|---|---|
| WO | WO 00/49211 | | 8/2000 |

* cited by examiner

*Primary Examiner*—Elizabeth D. Wood
(74) *Attorney, Agent, or Firm*—Wood, Phillips, Katz, Clark & Mortimer

(57) ABSTRACT

The present invention relates to a fibrous construct which is used in providing cementitious mixtures supplemental and reinforcing strength upon setting, and more particularly, to a unitized fibrous construct which comprises a plurality of oriented reinforcing fibrous components, wherein the fibrous components can be cut to a predetermined and finite cut length upon formation and remain in a plural parallel form until such point the unitized fibrous substrate is incorporated and subjected to mechanical agitation during preparation of a cementitious blend or mixture.

26 Claims, 2 Drawing Sheets

UNITIZED FIBROUS CONCRETE REINFORCEMENT

CROSS-REFERENCE TO RELATED APPLICATIONS

The present application claims the benefit of U.S. Provisional Patent Application No. 60/442,574, filed Jan. 24, 2003, No. 60/442,672, filed Jan. 24, 2003, No. 60/474,039, filed May 29, 2003, and No. 60/474,049, filed May 29, 2003.

TECHNICAL BACKGROUND

This invention relates to a fibrous construct which is used in providing cementitious mixtures supplemental and reinforcing strength upon setting, and more particularly, to a unitized fibrous construct which comprises a plurality of oriented reinforcing fibrous components having a finite cut length, said finite cut length providing a useful means for accurately dosing cementitious mixtures. In one embodiment, a circumferential retaining element provides temporary retention of the oriented reinforcing fibrous components until such point the unitized fibrous substrate is incorporated and subjected to mechanical agitation during preparation of a cementitious blend or mixture. In an alternate embodiment, a binding agent is employed.

BACKGROUND OF THE INVENTION

Many proposals have been made to reinforce, strengthen, or otherwise beneficially alter the properties of cementitious mixtures by applying and/or incorporating various types of fibrous components, including asbestos, glass, steel, as well as synthetic polymer fibers to aqueous based concrete mixes prior to the curing of the concrete. The types of polymer fibers in use or proposed for use include those composed of natural and synthetic composition.

As is evident in the prior art, individual fibrous components are well known in terms of their performance modifying attributes. Relatively large diameter fibers, for example, in excess of 40 to 60 microns in diameter, can be added to a cementitious mixture such as a wet concrete blend by mechanical agitation, followed by pouring and curing of the concrete. Large diameter fibers serve to reinforce the concrete after it has been cured, by providing additional tensile strength and minimizing impact damage and crack propagation. Small diameter fibers, typically less than 30 to 40 microns in diameter, and having a relatively high surface area, are commonly added to concrete mixes in order to reduce the development of small cracks in the concrete during the curing period. The problem of crack development is known to occur as a result of uneven curing of the concrete.

The fibrous components used typically in the practice of reinforcing cementitious mixtures include specifically thermoplastic synthetic fibers of finite staple length, such as polypropylene staple fibers. Thermoplastic staple fibers are produced by a well known and economical melt spinning process, in which molten polymer is extruded through a die having a plurality of small openings to produce a tow of continuous thermoplastic filaments of a controlled diameter. The filaments are cooled and drawn or elongated to increase tensile strength. A size or finish is usually applied to the filaments, followed by drying and cutting into the desired length to provide bundles of individual fibers. The use of polypropylene fibers is desirable for several reasons, including low raw material cost, beneficial physical properties such as malleability, and the non-reactive chemical properties of the polymer in the adverse environments frequently encountered in cementitious mixtures (i.e. strongly alkaline pH).

While the functional performance of the reinforcing fibrous components is beneficial, the means for the quantitative measurement, physical addition and homogenous distribution of the reinforcing fibrous components into a cementitious mixture is not without issue. Staple length fibers, as have been conventionally used, are provided in the same form as such are manufactured from the fiber formation line, which included agglomerates of various size and weight, tangles or knots of intermingled staple fibers, and numerous individual staple fibers that are in and of themselves prone to release randomly. Due to the variable and unpredictable form conventional reinforcing fibrous components have heretofore been provided for end-use consumption, such as at a construction work-site, the accurate and reproducible dosing of reinforcing fibrous component into sequential batches of cementitious mixtures has been dubious at best. Further complicating the actual utilization of the reinforcing fibrous components, numerous synthetic thermoplastic polymers used in the formation of suitable staple fibers are inherently hydrophobic in nature. As a result, difficulties can arise in obtaining a uniform dispersion and blending of the reinforcing fibrous component throughout hydrous cementitious mixtures using conventional mixing equipment.

Prior attempts to address the issue described have focused on the use of binding agents. U.S. Pat. No. 5,399,195, incorporated herein by reference, discloses the addition of small amounts of fine (less than 30 microns) polymer fibers to concrete. During production, the filaments are treated with a topical wetting agent. After the filaments are chopped into staple-length fibers, the wetting agent holds or binds the staple fibers together in the form of micro-bundles. The micro-bundles remain relatively stable during handling, and when the fibers are added to the concrete mix, the wetting agent promotes dispersion of the fibers. U.S. Pat. No. 6,258,159, also incorporated herein by reference, attempts to address the forming of micro-bundles of fibers by incorporation of binding agents into the staple fibers themselves during the melt-extrusion process.

The use of binding agents, whether internal or externally applied, while improving in-part issues inherent of individual staple fibers, such practices have not obviated such problems as random agglomerate size, and further, the use of binding agents has introduced additional problems. Most notably, the corresponding performance of the binding agent is based upon application of the binding agent to the reinforcement fibrous components such that the binding agent is both uniformly applied to the majority of the fibers so as to obtain equivalency within the batch, and that no excess binding agent is introduced as such will adversely effect the ability of the reinforcement fibrous components to disengage and distribute homogeneously. One other determent encountered in the use of binding agents is that air is often entrained within the micro-bundles upon application and agglomeration of the staple fibers. When such micro-bundles are subjected to mechanical mixing, the entrained air is released as a foam, a foam that reasonably compromises the ability of the cementitious mixture to cure uniformly.

As is evident in the industry, a unmet need exists for a means of introducing reinforcing fibrous components into a cementitious mixture such that the reinforcing fibrous components exhibit the attributes of uniform and predictable presentation for use, ability to be homogenous distributed during mechanical agitation, and does not introduce an adverse chemical agent which can compromise the performance of the resulting cementitious matrix.

SUMMARY OF THE INVENTION

The present invention relates to a fibrous construct which is used in providing cementitious mixtures supplemental and reinforcing strength upon setting, and more particularly, to a unitized fibrous construct which comprises a plurality of oriented reinforcing fibrous components which can be cut to a predetermined and finite cut length upon formation, and remain in a plural parallel form until such point the unitized fibrous substrate is incorporated and subjected to mechanical agitation during preparation of a cementitious blend or mixture. The reinforcing fibrous components can be combined with a circumferential retaining element, said circumferential retaining element providing temporary retention of the oriented reinforcing fibrous components. The unitized fibrous construct is endowed with inherent and improved dispensability and dispersability of the associated reinforcing fibrous component into organic or inorganic cementitious matrixes, such as concrete, mortar, plaster, etc.

In one embodiment, the unitized fibrous construct of the present invention is formed from two or more reinforcing fibrous components of finite staple length and essentially parallel orientation and can include a circumferential retaining element. In another embodiment, the unitized fibrous construct of the present invention is formed from two or more reinforcing fibrous components of infinite length and essentially parallel orientation and can include a circumferential retaining element. The compositions of the reinforcing fibrous component is selected from the group consisting of synthetic polymers, natural polymers, and the combinations thereof, and are not necessarily of the same polymeric composition, denier, finite staple length, or functionality. The circumferential retaining element describes a route about the combined two or more essentially parallel reinforcing fibrous components, thereby maintaining both the combination and essentially parallel orientation of the reinforcing fibrous components. Once formed, the circumferential retaining element aids in maintaining the integrity of the unitized fibrous construct, and the reinforcing fibrous component therein, for purposes of shipment, measurement, and dosing into a cementitious mixture. Preferably, the circumferential retaining element circumscribes no more than 80% of the total surface area of the unitized fibrous construct; more preferably circumscribes no more than 50% of the total surface area of the unitized fibrous construct; and most preferably circumscribes no more than 30% of the total surface area of the unitized fibrous construct, wherein the total surface area is defined as the overall length and circumference of the unitized fibrous construct. Limiting the circumferential retaining element serves to expose the significant and useful proportion oriented reinforcing fibrous components within the unitized fibrous constructs to the external environment. Upon mechanical agitation of the unitized fibrous construct in a cementitious mixture, the circumferential retaining element is disrupted, allowing for the homogenous release, distribution and dispersion of the reinforcing fibrous component into the overall cementitious mixture.

The circumferential retaining element is selected from suitable materials, such as thermoplastic, thermoset and soluble resins, which are subject to mechanical failure when a corresponding stress and/or solvency threshold is exceeded. Various geometries may be employed in the application of the circumferential retaining element, including without limitation, continuous or discontinuous filaments, ribbons, or sheets, which circumscribe the combined, essentially parallel reinforcing fibrous components. The circumferential retaining element may comprise one or more continuous or discontinuous filaments, ribbons, or sheets of varying thicknesses that retain the reinforcing fibrous components by a plurality of wrapping techniques so as to expose more or less fiber to the external environment. It is within the purview of the present invention that the composition of the circumferential retaining elements and of one or more of the reinforcing fibrous components need not necessarily be the same.

It should be noted that the reinforcing fibrous components, as well as the resulting unitized fibrous constructs, can be treated with performance modifying additives, such as represented by the topical application of a material flow-enhancing lubricant. Further, temporary binding agents, including water-soluble chemistries such as polyvinyl alcohol, can be used in conjunction with the circumferential binding element.

The present unitized fibrous construct can also be formed by the interlocking of the reinforcing fibrous components by chemical and/or mechanical means. Such suitable means include the application of a binder that exhibits sufficient durability to maintain the plural parallel form, and yet is discernable or otherwise deficient in durability when subjected to an appropriate mechanical or solvation force. Preferably, the chemical and/or mechanical interlocking means comprises no more than 80% of the total surface area of the unitized fibrous construct; more preferably comprises no more than 50% of the total surface area of the unitized fibrous construct; and most preferably comprises no more than 30% of the total surface area of the unitized fibrous construct, wherein the total surface area is defined as the overall length and circumference of the unitized fibrous construct. Limiting the chemical and/or mechanical interlocking means serves to expose the significant and useful proportion of the oriented reinforcing fibrous components within the unitized fibrous constructs to the external environment.

Upon final formation of the unitized fibrous constructs, the constructs can be readily packaged through an automatic packaging system or containerized in bulk. The latter packaging allows for a quantity of unitized fibrous constructs to being accurately and reproducibly augured, scooped or blended into a cementitious mixture at a mixing station, for example, through an automated gravimetric dispensing system.

Other features and advantages of the present invention will become readily apparent from the following detailed description, the accompanying drawings, and the appended claims.

DETAILED DESCRIPTION

Figure 1:
FIG. 1 is a photograph of a representative unitized fibrous construct as formed in accordance with the present invention, approximate dimensions are an overall circumference of 25 mm and a length of 18 mm.
Figure 2:
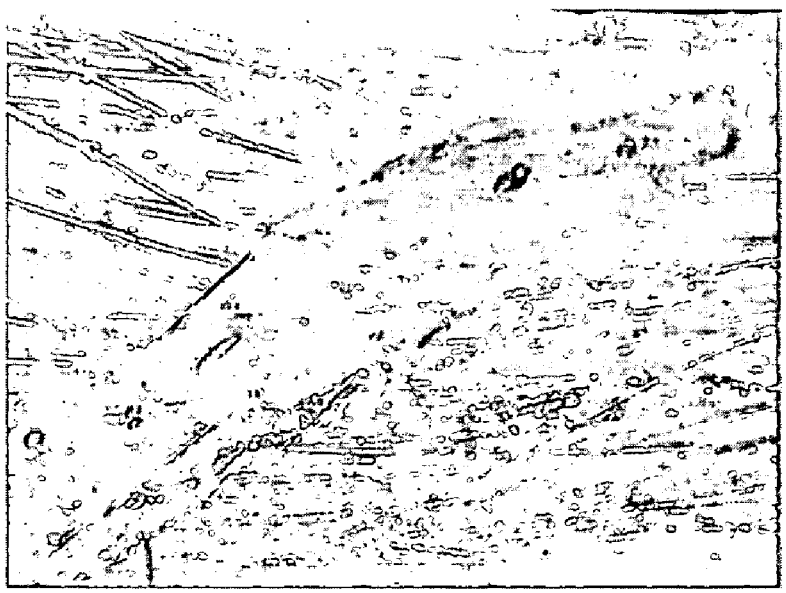
FIG. 2 is a photomicrograph of the same unitized fibrous construct as shown in FIG. 1, wherein the plurality of reinforcing fibrous components and the single circumferential retaining element are more specifically depicted.
Figure 3:
FIG. 3 is a photograph of a representative unitized fibrous construct as formed in accordance with the present invention.
Figure 4:
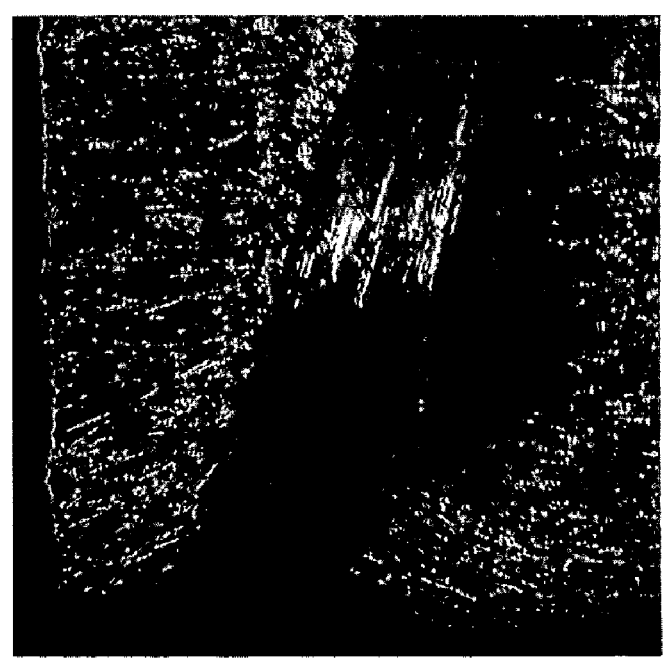
FIG. 4 is a photomicrograph of the same unitized fibrous construct as shown in FIG. 3, wherein the plurality of reinforcing fibrous components and the single circumferential retaining element are more specifically depicted.

While the present invention is susceptible of embodiment in various forms, hereinafter is described a presently preferred embodiment of the invention, with the understanding that the present disclosure is to be considered as an exemplification of the invention, and is not intended to limit the invention to the specific embodiment illustrated.

Finite staple length fibers are routinely used as a reinforcement means in cementitious mixtures so as to render a corresponding cured cementitious construct incorporating such fibers more resistant to structural defect and failure. Due to difficulties encountered in the actual handling and homogenous incorporation of the finite staple length fibers experienced in preparing a cementitious mixture, the present invention is directed to a means for facilitating such preparation in an accurate and reproducible way.

A unitized fibrous construct which comprises a plurality of oriented reinforcing fibrous components is formed such that the fibrous components have an essentially parallel orientation. The unitized construct is provided temporary retention of the reinforcing fibrous components, which can take the form of a circumferential retaining element, until such point the unitized fibrous substrate is incorporated and subjected to mechanical agitation during preparation of a cementitious blend or mixture. The unitized fibrous construct is endowed with inherent and improved dispensability and dispersability of the associated reinforcing fibrous component into organic or inorganic cementitious matrixes, such as concrete, mortar, plaster, etc.

In one embodiment, the unitized fibrous construct of the present invention is formed from two or more reinforcing fibrous components of finite staple length and essentially parallel orientation, wherein the composition of such staple fibers is selected from the group consisting of synthetic polymers, including, but not limited in polyesters, polyolefins, polyamides, and the combinations thereof, as well as natural fibers, including, but not limited to rayon, cotton, pulp, flax, and hemp and the combinations thereof. Preferably, the composition of the reinforcing fibers is selected from the synthetic polymers including, without limitation, thermoplastic and thermoset polymers. A particularly preferred embodiment of the present invention is directed to reinforcing staple fibers comprising polyolefin thermoplastic resins. In another embodiment, the unitized fibrous construct of the present invention is formed from two or more reinforcing fibrous components of infinite length and essentially parallel orientation, wherein the composition of such fibers is selected from the group consisting of synthetic polymers, natural polymers, and the combinations thereof. It is within the purview of the present invention that the individual reinforcing fibrous components as incorporated in the unitized fibrous construct need not necessarily be of the same polymeric composition, denier, finite staple length, or functionality. It is further within the purview of the present invention that either a portion of the reinforcing fibrous components or all of the reinforcing fibrous components may be placed under tension by means of twisting the reinforcing fibrous components or by other means. Placing tension on some or all of the reinforcing fibrous components causes the fibrous components to burst or pop upon mechanical agitation, which enhances the fiber distribution within a cementitious mixture.

In this embodiment, the unitized fibrous construct further includes a circumferential retaining element. The circumferential retaining element describes a route about the combined two or more essentially parallel reinforcing fibrous components, thereby maintaining both the combination and essentially parallel orientation of the reinforcing fibrous components. Once formed, the circumferential retaining element aids in maintaining the integrity of the unitized fibrous construct, and the reinforcing fibrous component therein, for purposes of shipment, measurement, and dosing into a cementitious mixture. Upon mechanical agitation, and optionally exposure to appropriate solvents, of the unitized fibrous construct in a cementitious mixture, the circumferential retaining element is disrupted, allowing for the homogenous release, distribution and dispersion of the reinforcing fibrous component into the overall cementitious mixture.

The circumferential retaining element is selected from suitable materials, such as thermoplastic, thermoset and soluble resins, which are subject to mechanical failure when a corresponding stress and/or solvency threshold is exceeded. Various geometries may employed in the application of the circumferential retaining element, including without limitation, continuous or discontinuous filaments, ribbons, or sheets, which circumscribe the combined, essentially parallel reinforcing fibrous components. The circumferential retaining element may comprise one or more continuous or discontinuous filaments, ribbons, or sheets of varying thicknesses that retain the reinforcing fibrous components by a plurality of wrapping techniques so as to expose more or less fiber to the external environment. It is within the purview of the present invention that the composition of the circumferential retaining elements and of one or more of the reinforcing fibrous components need not necessarily be the same.

In one embodiment, the reinforcing fibrous components are retained by two thin circumferential retaining elements in a double helix wrapping technique, whereby two circumferential retaining elements criss-cross back and forth about the circumference of the fibrous components. It is within the purview of the present invention that the composition of the circumferential retaining elements and of one or more of the reinforcing fibrous components need not necessarily be the same. Preferably, the circumferential retaining element circumscribes no more than 80% of the total surface area of the unitized fibrous construct; more preferably circumscribes no more than 50% of the total surface area of the unitized fibrous construct; and most preferably circumscribes no more than 30% of the total surface area of the unitized fibrous construct. Limiting the circumferential retaining element serves to expose the oriented reinforcing fibrous components within the unitized fibrous constructs to the external environment. In addition, the exposure of the fibrous components allows for more effective disruption of the unified fibrous construct when subjected to mechanical or solvent disruption.

A number of suitable methodologies exist for the formation of unitized fibrous constructs in accordance with the present invention. A preferred, though non-limiting, method is taught in part by U.S. Pat. No. 4,228,641, incorporated herein by reference, wherein a twine comprised of a core bundle of synthetic monofilaments is circumscribed by a synthetic material in a thin band form spirally wound about the monofilaments. It has been found by the inventors of the present invention that by practice of the '641 method, with subsequent and repeated scission of the continuous twine construct at or between each iteration of the spiral winding that finite length unitized fibrous constructs are formed which are suitable for practice in light of the present invention.

The dimensions of the unitized fibrous construct is defined in terms of; the overall circumference, as based on the quantity and relative denier of the individual reinforcing fibrous components, and of length, as based on the greatest finite staple length of the cumulative combination of reinforcing fibrous components. Suitable overall circumferences and lengths of unitized fibrous constructs formed in accordance with the present invention may reasonably range from 3 mm to 150 mm and from 8 mm to 100 mm, respectively. In a presently preferred embodiment for standard practices, unitized fibrous constructs exhibit an overall diameter of between 3 mm and 30 mm and lengths of between 12 mm and 50 mm may be utilized.

In accordance with the present invention, the reinforcing fibrous components may also be of infinite length, wherein the reinforcing fibrous components are combined in an essentially parallel orientation, whereby one or more circumferential retaining elements circumscribes about the overall circumference of the continuous reinforcing fibrous components, or whereby one or more chemical and/or mechanical interlocking means circumscribes about the overall circumference of the continuous reinforcing fibrous components. Such a formation allows the continuous unitized reinforcing fibrous components to be available in a continuous roll form or packaged in a continuous lap formation. Further, the continuous unitized reinforcing fibrous components are comprised of a series of segmented perforations or weakened points along the continuous formation so that the desired portion may be selected and detracted from the roll form.

It should be noted that the reinforcing fibrous components, as well as the resulting unitized fibrous constructs, can be treated with performance modifying additives, such as represented by the topical application of a material flow-enhancing lubricant and temporary binding agents, such as water-soluble chemistries.

The interlocking of the reinforcing fibrous components embodying the present invention can also be by chemical and/or mechanical means forms the unitized fibrous construct. Such suitable means include the application of a binder that exhibits sufficient durability to maintain the plural parallel form, and yet is discernable or otherwise deficient in durability when subjected to an appropriate external force. Preferably, the chemical and/or mechanical interlocking means comprises no more than 80% of the total surface area of the unitized fibrous construct; more preferably comprises no more than 50% of the total surface area of the unitized fibrous construct; and most preferably comprises no more than 30% of the total surface area of the unitized fibrous construct. Limiting the chemical and/or mechanical interlocking means serves to expose the significant and useful proportion of the oriented reinforcing fibrous components within the unitized fibrous constructs to the external environment. In addition, the exposure of the fibrous components allows for more effective disruption of the unified fibrous construct when subjected to mechanical or solvent disruption.

Once formed, an interlocking means or agent, such as a polyvinyl alcohol or other water-soluble binding agent aids in maintaining the integrity of the unitized fibrous construct, and the reinforcing fibrous component therein, for purposes of shipment, measurement, and dosing into a cementitious mixture. Upon mechanical agitation, and optionally exposure to appropriate solvents, of the unitized fibrous construct in a cementitious mixture, the interlocked structure is disrupted, allowing for the homogenous release, distribution and dispersion of the reinforcing fibrous component into the overall cementitious mixture.

Upon final formation of the unitized fibrous constructs, the constructs can be readily packaged through an automatic packaging system or containerized in bulk. The latter packaging allows for a defined quantity of unitized fibrous constructs to being accurately and reproducibly augured, scooped or blended into a cementitious mixture at mixing station, through an automated gravimetric dispensing system.

From the foregoing, it will be observed that numerous modifications and variations can be affected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

What is claimed is:

1. A method of improving the properties of a cementitious mixture, wherein said method comprises the steps of:
   a. providing a cementitious mixture;
   b. providing unitized fibrous constructs, each of said unitized fibrous constructs being comprised of:
      i. two or more reinforcing fibrous components;
      ii. one or more circumferential retaining elements;
      iii. wherein said reinforcing fibrous components are combined in an essentially parallel orientation and said circumferential retaining element extends spirally and circumscribes about an overall circumference described by said combined and essentially parallel reinforcing fibrous components,
      said circumferential retaining element circumscribing no more than 80% of the total circumferential surface area of said unitized fibrous constructs;
   c. adding into said cementitious mixture a quantity of unitized fibrous constructs so as to form a cementitious mixture and unitized fibrous construct blend; and
   d. mechanically agitating said cementitious mixture/unitized fibrous construct blend so as to disrupt said circumferential retaining elements and disperse said reinforcing fibrous components into said cementitious mixture.

2. A method as in claim 1, wherein said fibrous constructs are natural fibers.

3. A method as in claim 2, wherein said natural fibers are selected from the group consisting of rayon, cotton, pulp, flax, hemp, and the combinations thereof.

4. A method as in claim 1, wherein said fibrous constructs are synthetic fibers.

5. A method as in claim 4, wherein said synthetic fibers are selected from the group consisting of polyesters, polyolefins, polyamides, and the combinations thereof.

6. A method as in claim 1, wherein said unitized fibrous constructs exhibit an overall circumference of between about 3 mm to 150 mm.

7. A method as in claim 6, wherein said unitized fibrous constructs exhibit an overall circumference of between about 3 mm to 30 mm.

8. A method as in claim 1, wherein said unitized fibrous constructs exhibit a length of between about 8 mm to 100 mm.

9. A method as in claim 8, wherein said unitized fibrous constructs exhibit a length of between about 12 mm to 50 mm.

10. A method as in claim 1, wherein said reinforcing fibrous compounds exhibit a finite staple length.

11. A method as in claim 1, wherein said reinforcing fibrous components exhibit an infinite length.

12. A method as in claim 1, wherein a portion or all of said reinforcing fibrous components are placed under tension.

13. A method as in claim 11, wherein said unitized fibrous constructs comprise perforated segments.

14. A method of improving the properties of a cementitious mixture, wherein said method comprises the steps of:
   a. providing a cementitious mixture;
   b. providing unitized fibrous constructs, each of said unitized fibrous constructs being comprised of:
      i. two or more reinforcing fibrous components;
      ii. an interlocking means;
      iii. wherein said reinforcing fibrous components are combined in an essentially parallel orientation and said interlocking means extends spirally and is applied about an overall circumference described by said combined and essentially parallel reinforcing fibrous components,
      said interlocking means comprising no more than 80% of the total circumferential surface area of the unitized fibrous constructs;
   c. adding into said cementitious mixture a quantity of unitized fibrous constructs so as to form a cementitious mixture and unitized fibrous construct blend; and
   d. mechanically agitating said cementitious mixture/unitized fibrous construct blend so as to disrupt said interlocking means and disperse said reinforcing fibrous components into said cementitious mixture.

15. A method as in claim 14, wherein said fibrous constructs are natural fibers.

16. A method as in claim 15, wherein said natural fibers are selected from the group consisting of rayon, cotton, pulp, flax, hemp, and the combinations thereof.

17. A method as in claim 14, wherein said fibrous constructs are synthetic fibers.

18. A method as in claim 14, wherein said synthetic fibers are selected from the group consisting of polyesters, polyolefins, polyamides, and the combinations thereof.

19. A method as in claim 14, wherein said unitized fibrous constructs exhibit an overall circumference of between about 3 mm to 150 mm.

20. A method as in claim 19, wherein said unitized fibrous constructs exhibit an overall circumference of between about 3 mm to 30 mm.

21. A method as in claim 14, wherein said unitized fibrous constructs exhibit a length of between about 8 mm to 100 mm.

22. A method as in claim 21, wherein said unitized fibrous constructs exhibit a length of between about 12 mm to 50 mm.

23. A method as in claim 14, wherein said interlocking means is a binder.

24. A method as in claim 14, wherein a portion or all of said reinforcing fibrous components are placed under tension.

25. A method as in claim 14, wherein said reinforcing fibrous components exhibit a finite staple length.

26. A method as in claim 14, wherein said reinforcing fibrous components exhibit an infinite length.

* * * * *